(12) United States Patent
Zhu et al.

(10) Patent No.: US 12,174,519 B1
(45) Date of Patent: Dec. 24, 2024

(54) QUICK ATTACHABLE AND DETACHABLE FIXING APPARATUS FOR PHOTOGRAPHIC EQUIPMENT

(71) Applicant: Zhongshan Dashan Photographic Equipment Co., LTD., Guangdong (CN)

(72) Inventors: Xihua Zhu, Guangdong (CN); Yuwen Han, Guangdong (CN); Yanning Wu, Guangdong (CN)

(73) Assignee: Zhongshan Dashan Photographic Equipment., LTD., Zhongshan (CN)

( * ) Notice: Subject to any disclaimer, the term of this patent is extended or adjusted under 35 U.S.C. 154(b) by 0 days.

(21) Appl. No.: 18/675,996

(22) Filed: May 28, 2024

(30) Foreign Application Priority Data

Jan. 11, 2024 (CN) .......................... 202410047255.7

(51) Int. Cl.
*G03B 17/56* (2021.01)
(52) U.S. Cl.
CPC .................................. *G03B 17/566* (2013.01)
(58) Field of Classification Search
CPC .................................................... F16M 11/041
See application file for complete search history.

(56) References Cited

U.S. PATENT DOCUMENTS

| | | | | |
|---|---|---|---|---|
| 5,230,490 A | * | 7/1993 | Sloop | F16M 13/00 396/419 |
| 2003/0218108 A1 | * | 11/2003 | Werner | F16M 11/041 396/419 |
| 2010/0264282 A1 | * | 10/2010 | Burklin | F16C 11/106 248/124.2 |

* cited by examiner

*Primary Examiner* — Noam Reisner
(74) *Attorney, Agent, or Firm* — Pierson Ferdinand LLP; Rachel H. Huffstetler

(57) ABSTRACT

A quick attachable and detachable fixing apparatus for photographic equipment comprises a base; a locking member rotatably connected to the base; a sliding member connected to the base and linearly slidable relative to the base; a quick assembly plate detachably fixed to the base by the locking member; a first elastic member for providing a biasing force to the sliding member, and a release-holding assembly. The release-holding assembly comprises a pin, a ball and a second elastic member. The pin is slidably disposed in the base, and the ball and the second elastic member are disposed in the sliding member. The locking member is switchable relative to the base between a lock position and an unlock position to lock or unlock the quick assembly plate onto the base. The sliding member is movable relative to the base between a hold position and a release position.

18 Claims, 6 Drawing Sheets

QUICK ATTACHABLE AND DETACHABLE FIXING APPARATUS FOR PHOTOGRAPHIC EQUIPMENT

CROSS-REFERENCE TO RELATED APPLICATIONS

The present application claims priority of Chinese Patent Application No. 202410047255.7, filed on Jan. 11, 2024, the entire contents of which are hereby incorporated by reference.

TECHNICAL FIELD

The present disclosure relates to the technical field of photographic equipment, and more specifically, to a quick attachable and detachable fixing apparatus for photographic equipment.

DESCRIPTION OF THE PRIOR ART

Cameras, camcorders, and other photographic equipment generally need to be mounted on photographic supporting devices such as tripods and monopods for ease of use. A photographic supporting device generally includes a supporting assembly and a fixing apparatus installed on the supporting assembly. The photographic equipment is fixed to the fixing apparatus and thereby fixed by the supporting assembly. To facilitate the user to quickly fix the photographic equipment, a fixing apparatus may include a base fixed on the supporting assembly and a quick assembly plate detachably connected to the base. Thus, how to achieve quick connection and lock of the quick assembly plate and the base is a major issue to be solved in this field.

SUMMARY OF THE DISCLOSURE

An objective of the embodiments of the present disclosure is to provide a quick attachable and detachable fixing apparatus for photographic equipment to achieve quick connection and lock of the quick assembly plate and the base.

A quick attachable and detachable fixing apparatus for photographic equipment comprise a base; a locking member rotatably connected to the base; a sliding member connected to the base and linearly slidable relative to the base; a quick assembly plate detachably fixed to the base by the locking member; a first elastic member for providing a biasing force to the sliding member, and a release-holding assembly, which comprises a pin, a ball and a second elastic member, the pin is slidably disposed in the base, and the ball and the second elastic member are disposed in the sliding member, wherein the locking member is movable relative to the base between a lock position and an unlock position, to lock the quick assembly plate to the base or unlock the quick assembly plate therefrom, and the sliding member is movable relative to the base between a hold position and a release position, wherein when the sliding member is in the hold position, the sliding member abuts against the locking member to maintain the locking member in the lock position, and the ball is received in the sliding member and compresses the second elastic member; wherein when the sliding member is moved to the release position, the locking member is released from abutment so that the locking member moves to the unlock position, the ball is partially engaged in the base and urges the pin to partially protrude out from the base; and the first elastic member is configured to provide a first force on the sliding member to bias the sliding member towards the hold position.

In some embodiments, the sliding member has a first abutment, and the locking member has a second abutment, when the sliding member is moved to the hold position, the first abutment and the second abutment abut against each other, and at least one of the first abutment and the second abutment is a slope.

In some embodiments, a first receiving hole for receiving the pin is defined in the base, and a second receiving hole for receiving the ball and the second elastic member is defined in the sliding member, when the sliding member is moved to the hold position, the first receiving hole and the second receiving hole are offset from each other, and when the sliding member is moved to the release position, the second receiving hole is aligned with and communicates with the first receiving hole.

In some embodiments, the quick attachable and detachable fixing apparatus for photographic equipment further comprises a third elastic member, the third elastic member abuts against the locking member and the base for providing a second force to bias the locking member towards the unlock position, wherein a torque applied by the second force to the locking member is less than a torque applied by the first force to the locking member.

In some embodiments, the base comprises a base plate and a side wall provided on a top perimeter of the base plate, a mounting groove for receiving the quick assembly plate is defined in the side wall, a receiving cavity for receiving the sliding member is defined at a bottom of the base plate, and the receiving cavity communicates with the mounting groove.

In some embodiments, the base further comprises a bottom plate fixedly connected to a bottom end of the base plate, and the bottom plate covers a lower end of the receiving cavity, thereby retaining the sliding member within the receiving cavity, two supporting portions are provided on the bottom plate, and the locking member is rotatably supported on the two supporting portions of the bottom plate through a rotating shaft.

In some embodiments, two mating holes are recessed on the bottom of the base plate corresponding to the two supporting portions, and the two supporting portions are respectively engaged in the two mating holes, an end of each supporting portions is opposite to a bottom wall of a corresponding mating hole and together form a hole for installing the rotating shaft.

In some embodiments, the sliding member comprises a body portion and an abutting portion located on one side of the body portion, the abutting portion is closer to a center of the base than the body portion, and the first elastic member is disposed between the abutting portion and an inner wall of the receiving cavity in a compressed state.

In some embodiments, a height of the abutting portion exceeds a height of the body portion.

In some embodiments, the quick attachable and detachable fixing apparatus for photographic equipment further comprises an unlock operating member, which is connected to the sliding member and protrudes outside the base, and the unlock operating member is operably pressed to move the sliding member to the release position.

In the quick attachable and detachable fixing apparatus for photographic equipment according to the embodiments of the present disclosure, the linearly movable sliding member abuts against the rotatable locking member to keep it in the lock position, and the first elastic member is used to provide a biasing force to keep the sliding member abutting against the locking member, thereby retaining the locking member in the lock position. This results reliable lock of the quick assembly plate. The quick attachable and detachable fixing apparatus for photographic equipment of the embodiment of the present disclosure has a simple structure and is easy to operate.

BRIEF DESCRIPTION OF DRAWINGS

In order to more clearly describe the technical solutions in the embodiments of the present disclosure, the following will briefly introduce the drawings needed in the description of the embodiments or the prior art. Obviously, the drawings in the following description are only of the present disclosure. For some embodiments, those of ordinary skill in the art can obtain other drawings based on these drawings without creative labor.

DESCRIPTION OF EMBODIMENTS

Figure 1:
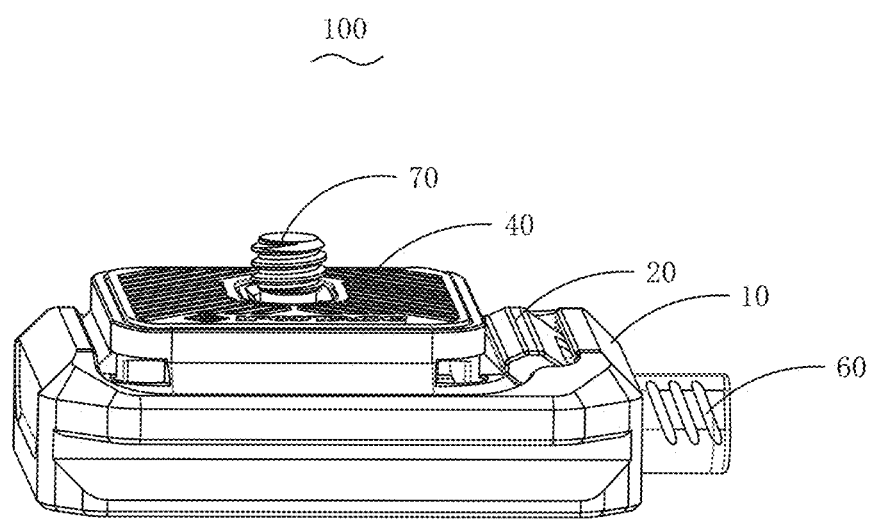
FIG. 1 is a three-dimensional assembly view of a quick attachable and detachable fixing apparatus for photographic equipment according to a first embodiment of the present disclosure.
Figure 2:
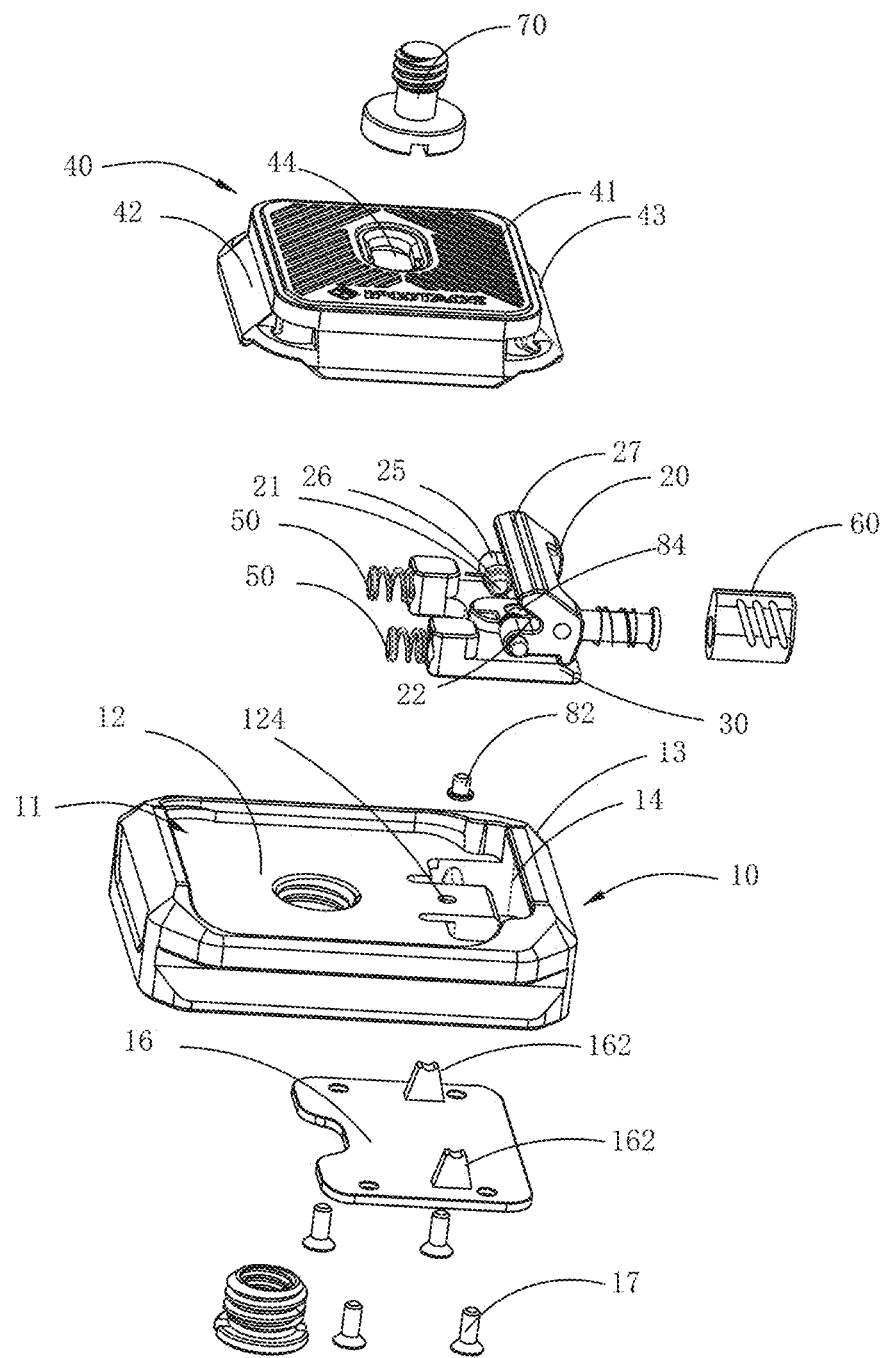
FIG. 2 is an exploded perspective view of the quick attachable and detachable fixing apparatus for photographic equipment shown in FIG. 1.
Figure 3:
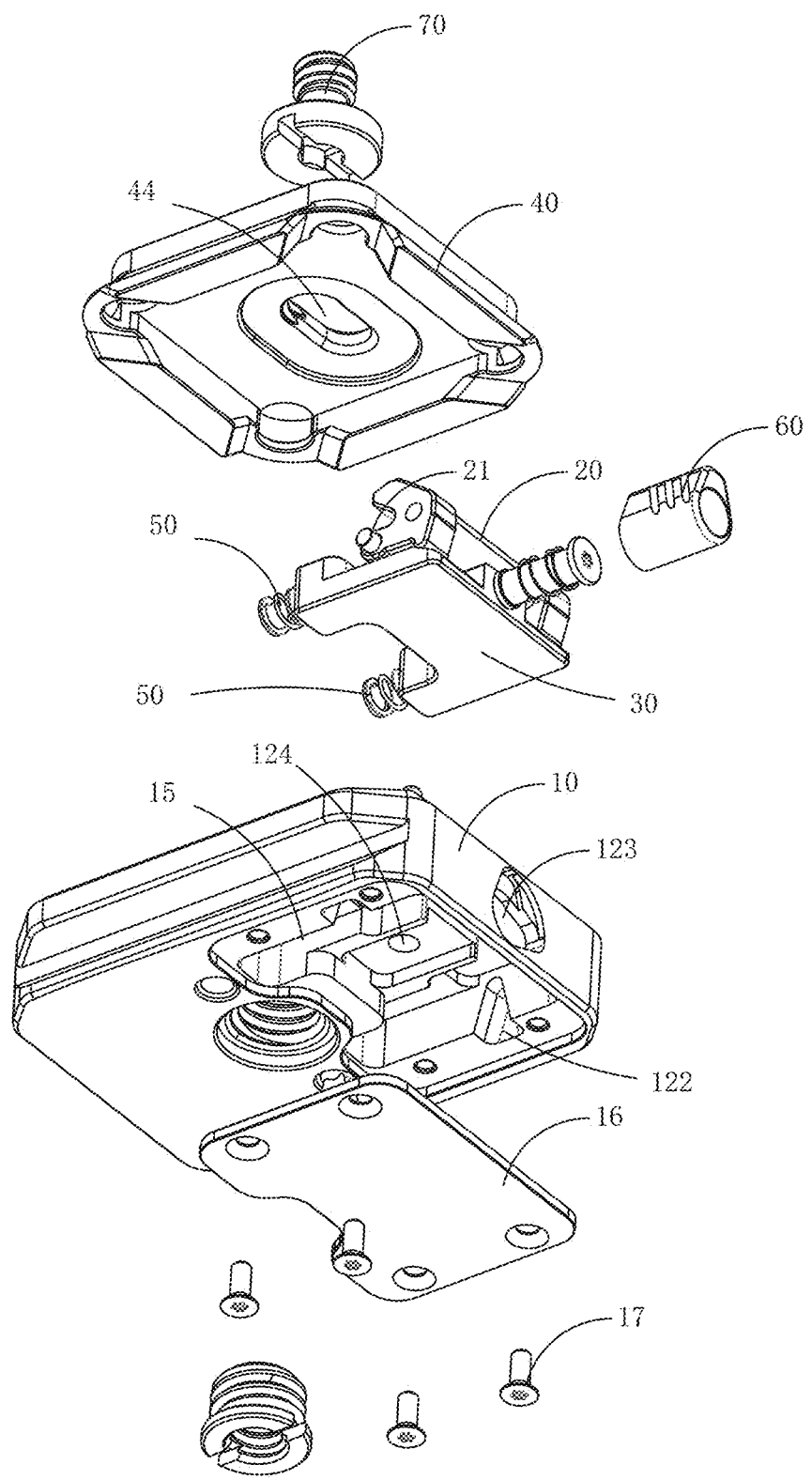
FIG. 3 is a view of the quick attachable and detachable fixing apparatus for photographic equipment shown in FIG. 2, viewed from another angle.
Figure 4:
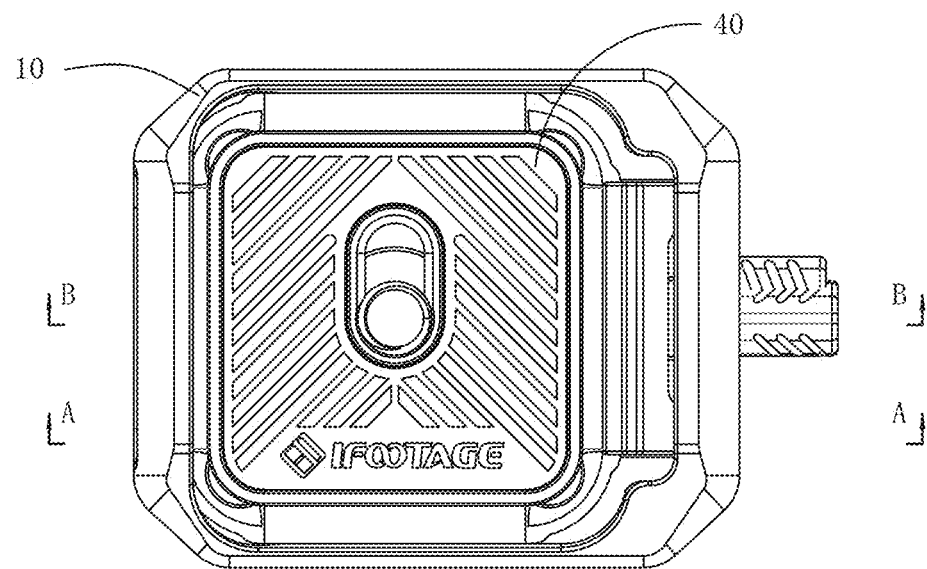
FIG. 4 is a top view of the quick attachable and detachable fixing apparatus for photographic equipment shown in FIG. 1.
Figure 5:
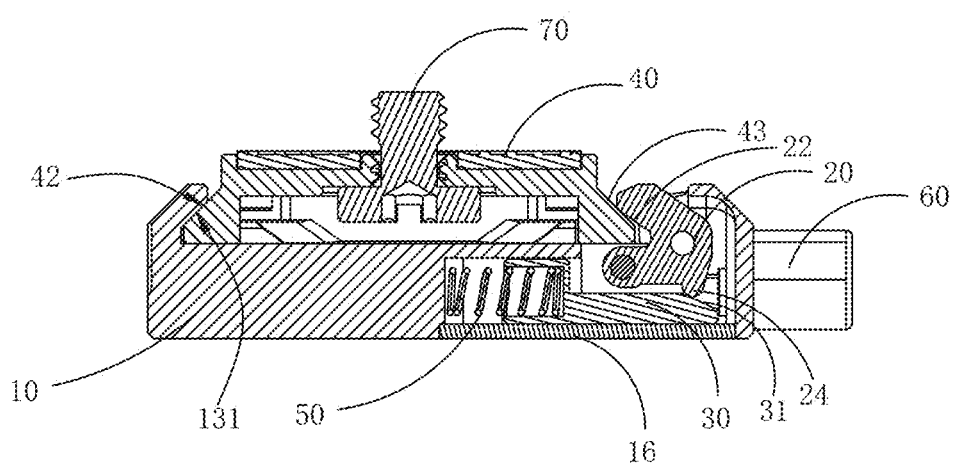
FIG. 5 is a cross-sectional view along the A-A line of the quick attachable and detachable fixing apparatus for photographic equipment shown in FIG. 4.
Figure 6:
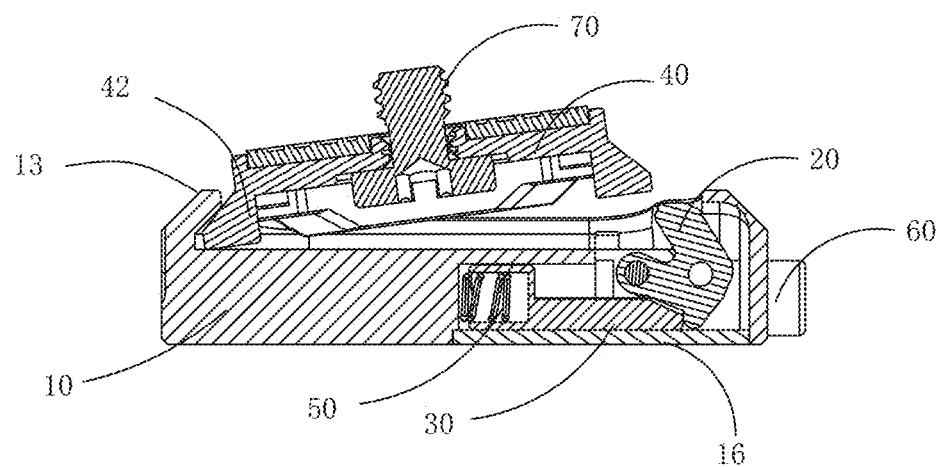
FIG. 6 is a schematic view of the locking member of the quick attachable and detachable fixing apparatus for photographic equipment shown in FIG. 5 in an unlock position.

In order to make the technical problems, technical solutions and beneficial effects to be solved by the present disclosure clearer, the present disclosure will be described in further detail below with reference to the accompanying drawings and embodiments. It should be understood that the specific embodiments described herein are only used to explain the present disclosure, but not to limit the present disclosure.

It should be noted that when an element is referred to as being "fixed to" or "arranged on" another element, it can be directly on the other element or indirectly on the other element. When an element is referred to as being "connected to" another element, it can be directly connected to the other element or indirectly connected to the other element.

It should be understood that the terms "center", "length", "width", "thickness", "upper", "lower", "front", "rear", "left", "The orientation or positional relationship indicated by "right", "vertical", "horizontal", "top", "bottom", "inside", "outside", etc. is based on the orientation or positional relationship shown in the drawings, and is only for convenience Describe the disclosure and simplify the description without indicating or implying that the referred device or element must have a particular orientation, be constructed and operate in a particular orientation, and therefore should not be construed as limiting the disclosure.

In this disclosure, "inside" refers to the side closer to the center of the corresponding component or the center of the entire device, and "outside" refers to the side farther from the center of the corresponding component or the center of the entire device.

In addition, the terms "first" and "second" are only used for descriptive purposes, and should not be construed as indicating or implying relative importance or implying the number of indicated technical features. Thus, a feature defined as "first" or "second" may expressly or implicitly include one or more of that feature. In the description of the present disclosure, "a plurality of" means two or more, unless otherwise expressly and specifically defined. "Several" means one or more than one, unless expressly specifically defined otherwise.

Please refer to FIGS. 1 through 6. According to an embodiment of the present disclosure, a quick attachable and detachable fixing apparatus for photographic equipment 100 includes a base 10, a locking member 20 rotatably connected to the base 10, a locking member 20 slidably connected to the base 10, a quick assembly plate 40 detachably fixed to the base 10 by the locking member 20, and a first elastic member 50 for providing a biasing force to the sliding member 30.

The locking member 20 is pivotably connected to the base 10 and can be switched between a lock position and an unlock position to lock the quick assembly plate 40 to the base 10 or unlock the quick assembly plate 40 therefrom. The sliding member 30 is linearly movable relative to the base 10 between a hold position and a release position. When the sliding member 30 is moved to the hold position, the sliding member 30 abuts against the locking member 20 to maintain it in the lock position; and when the sliding member 30 is moved to the release position, the locking member 20 is released from abutment so that the locking member 20 can be moved to the unlock position, and at this time, the quick assembly plate 40 can be lifted upwardly away from the base 10. One end of the first elastic member 50 abuts against the sliding member 30 and the other end against the base 10, providing a force to the sliding member 30 to always bias it towards the hold position. In this embodiment, the first elastic member 50 is a compression spring.

In this embodiment, the attachable and detachable fixing apparatus for photographic equipment 100 further includes an unlock operating member 60. The unlock operating member 60 is connected to the sliding member 30 and protrudes outside the base 10. By pressing the unlock operating member 60, the sliding member 30 can be moved towards the release position, thereby unlocking the quick assembly plate 40. At this point, the first elastic member 50 is compressed, exerting a resetting force on the sliding member 30.

The quick assembly plate 40 is fixedly connected with a connecting piece 70 for connecting with cameras, camcorders and other photographic equipment. The base 10 is connectable to a stand, such as a tripod or a monopod. In this way, photographic equipment, such as cameras and camcorders, can be quickly attached to the stand by the quick attachable and detachable fixing apparatus 100 of the present disclosure, making it convenient to use.

The quick assembly plate 40 is generally square in shape with a top wall 41 and first and second inclined walls 42, 43 located on opposite sides of the top wall 41. The first and second inclined walls 42, 43 extend outwardly and downwardly from corresponding edges of the top wall 41, preferably at an angle of 45° to the top wall 41. An assembly hole 44 is defined in a center of the top wall 41, and the connector 70 is fixed on the quick assembly plate 40 by mating with the assembly hole 44.

The base 10 is generally square in shape with a mounting groove 11 defined centrally at a top thereof for receiving the quick assembly plate 40. Preferably, a shape and size of the mounting groove 11 are approximately adapted to the quick assembly plate 40. The mounting groove 11 has opposite first and second sides corresponding to the first and second inclined walls 42, 43 of the quick assembly plate 40, respectively.

Specifically, the base 10 includes a base plate 12 and a side wall 13 provided around a top of the base plate 12, with the side wall 13 surrounding and defining the mounting groove 11. In this embodiment, the side wall 13 is closed in a circumferential direction. An inner surface of the side wall 13 corresponding to the first side of the mounting groove 11 is configured as a first inclined surface 131, which is approximately complementary to the first inclined wall 42 of the quick assembly plate 40. That is, the first surface 131 of the side wall 13 is also inclined downward and outward. A mounting opening 14 is defined in the second side of the mounting groove 11 of the base 10. The locking member 20 is disposed within the mounting opening 14 and is rotatably connected to the base 10 through a rotating shaft 21. The locking member 20 has a second inclined surface 22 for mating with the second inclined wall 43 of the quick assembly plate 40. The second inclined surface 22 is directly opposite to the first inclined surface 131, and the second inclined surface 22 is also inclined downward and outward. The arrangement of the first inclined surface 131 and the second inclined surface 22 allows the mounting groove 11 to be configured as a dovetail groove. In this way, the dovetail groove mates with the first and second inclined walls 42, 43 of the quick assembly plate 40 to lock the quick assembly plate 40 to the base 10.

A receiving cavity 15 is defined at a bottom of the base 10, and the sliding member 30 is received in the receiving cavity 15. The sliding member 30 is movable linearly within the receiving cavity 15 between the hold position and the release position. Specifically, the receiving cavity 15 is defined at a bottom of the base plate 12 and communicates with the mounting groove 11. The receiving cavity 15 is opened downward to facilitate the sliding member 30 installation. The base 10 further includes a bottom plate 16 fixedly connected to a bottom end of the base plate 12, which covers a lower end of the receiving cavity 15, thereby retaining the sliding member 30 within the receiving cavity 15 without detachment. Specifically, the bottom plate 16 may be fixed to the bottom end of the base plate 12 by a fastener 17 (e.g., a screw).

Preferably, an upper surface of the bottom plate 16 is provided with two supporting portions 162, which are spaced apart and protrude towards the base plate 12. Two mating holes, which are blind holes, are recessed at the bottom of the base plate 12, corresponding to the two supporting portions. When the two supporting portions are respectively engaged in the two mating holes, a top end of each supporting portions 162 is opposite to a bottom wall of a corresponding mating hole 122 and defines a shaft hole therebetween for installing the rotating shaft 21. Preferably, the top end of each two support portions 162 has a concave arc surface.

Preferably, a perforation 123 is defined in the base plate 12 and penetrates one side surface thereof, and communicates with the receiving cavity 15. The unlock operating member 60 passes through the perforation 123 to connect with the sliding member 30 disposed within the receiving cavity 15.

The locking member 20 includes a connecting portion 25 below the second inclined surface 22, which is used to connect with the rotating shaft 21. The rotating shaft 21 is adapted to the shaft hole such that the locking member 20 is rotationally connected to the base 10. In this embodiment, the locking member 20 includes two connecting portions 25 arranged to be spaced apart. Correspondingly, there are also two rotating shafts 21, which are respectively supported in the two shaft holes of the base 10. The connecting portion 25 and the second inclined surface 22 are arranged at an angle, preferably 45°. The two connecting portions 25 are arranged parallel to each other, and each of them defines a fixing hole for assembling the rotating shaft 21. The two rotating shafts 21 are respectively assembled in fixing holes of the two connecting portions 25. After assembly, the two rotating shafts 21 are coaxially and spaced apart.

Preferably, a second elastic member 26 is mounted around the rotating shaft 21. The second elastic member 26 abuts against the locking member 20 and the base 10, for providing a force to the locking member 20 to bias it towards the unlock position. In this way, when the sliding member 30 is moved by operating the unlock operating member 60 to release the abutment against the locking member 20, the locking member 20 can rotate automatically to the unlock position under the force of the second elastic member 26 making it convenient for the user to remove the quick assembly plate 40. It can be understood that a torque applied by the second force to the locking member 20 is smaller than that applied by the first force to the locking member 20.

In addition, a top of the locking member 20 has a top inclined surface 27, which extends inclinedly downwardly and inwardly (ie, towards a center of the base 10) until connects with the second slope 22 below. As such, when installing the quick assembly plate 40, it is only necessary to engage the first inclined wall 42 of the quick assembly plate 40 in the first side of the mounting groove 11 to mate with the first inclined surface 131, and then press the second inclined wall 43 to abut against the top of the locking member 20 and continue to press down against the elastic force of the second elastic member 26, the second inclined wall 43 then slides over the top inclined surface 27 of the locking member 20 to reach and mate with a lower portion of the second inclined surface 22, thereby achieving the lock of the quick assembly plate 40.

The sliding member 30 has a first abutment 31, and the locking member 20 has a second abutment 24. When the sliding member 30 is moved to the hold position, the first abutment 31 and the second abutment 24 abut against each other. Preferably, the first abutment 31 is a slope, and the second abutment 24 is a bottom end of the locking member 20. Owning to the slope, the virtual position caused by assembly or wear between the first abutment 31 and the second abutment 24 can be eliminated. This ensures that the sliding member 30 consistently abuts against the locking member 20 in a locked state and the locking member 20 is kept in the lock position, thereby improving the connection reliability of the quick assembly plate 40. It could be understood that the slope may also be deposed on the second abutment 24, and a shape and structure of the first abutment 31 are not limited. The first abutment 31 may be any portion of the sliding member 30, as long as it can abut against the second abutment 24. This also eliminates the virtual position between the first abutment 31 and the second abutment 24, thereby improving the lock reliability of the fixing apparatus for photographic equipment of the present disclosure.

Figure 7:
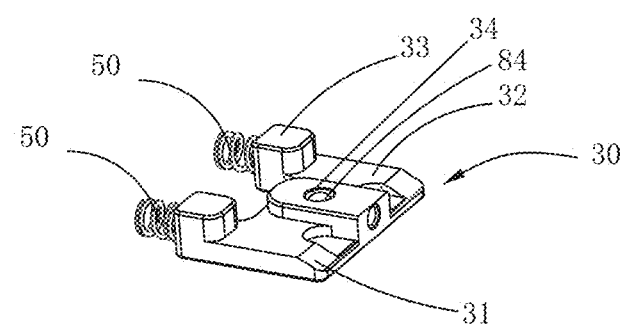
FIG. 7 is a sliding member of quick attachable and detachable fixing apparatus for photographic equipment shown in FIG. 2.
Figure 8:
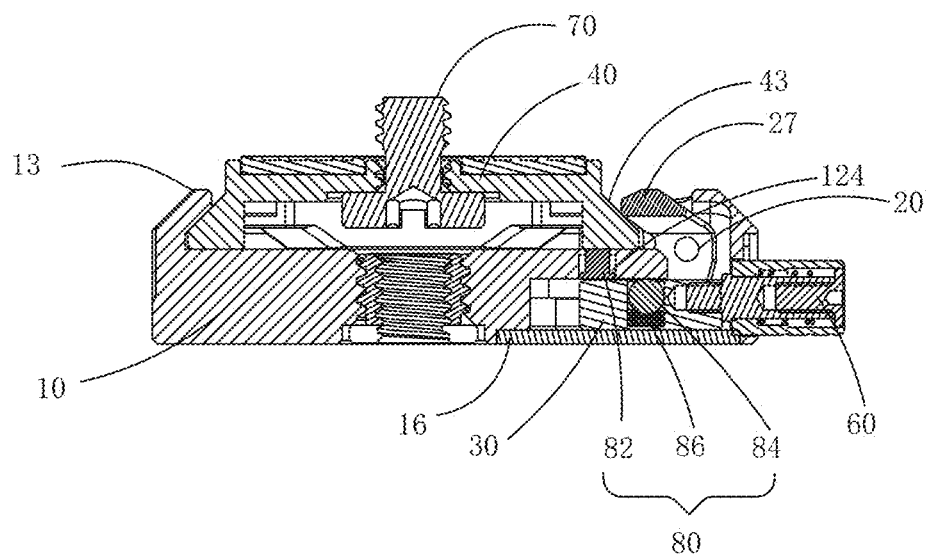
FIG. 8 is a cross-sectional view along the B-B line of the quick attachable and detachable fixing apparatus for photographic equipment shown in FIG. 4.
Figure 9:
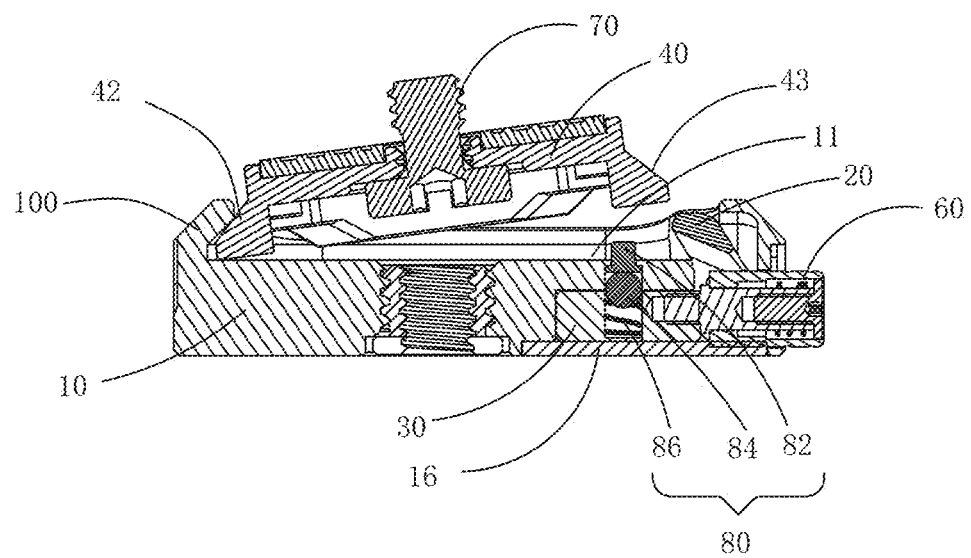
FIG. 9 is a schematic view of the locking member of the quick attachable and detachable fixing apparatus for photographic equipment shown in FIG. 8 in an unlock position.

Specifically, please refer to FIG. 7 as well. The sliding member 30 includes a substantially square body portion 32 and an abutting portion 33 located on an inner side the body portion 32, which is closer to the center of the base 10. A surface of the abutting portion 33 away from the body portion 32 is spaced apart from an inner wall of the receiving cavity 15. The first elastic member 50 is deposed between the abutting portion 33 and the inner wall of the receiving cavity 15 in a compressed state. The first abutment 31 is formed by an outer surface of the body portion 32 away from the abutting portion 33 (i.e., a surface on a side away from the center of the base 10). In this embodiment, a height of the abutting portion 33 exceeds that of the body portion 32, to ensure that the abutting portion 33 has a sufficiently large surface to abut against the first elastic member 50.

Please refer to FIGS. 2 through 3 and FIGS. 8 through 9. Preferably, the fixing apparatus for photographic equipment 100 of this embodiment further includes a release-holding assembly 80 for keeping the sliding member 30 in place when the sliding member 30 is moved to the release position. Specifically, the release-holding assembly 80 includes a pin 82, a ball 84 and a third elastic member 86. A first receiving hole 124 for receiving the pin 82 is defined in the base plate 12, and a second receiving hole 34 for receiving the ball 84 and the third elastic member 86 is defined in the sliding member 30. A top end of the first receiving hole 124 penetrates a top surface of the base plate 12 so as to communicate with the mounting groove 11, while a bottom end of the first receiving hole 124 communicates with the receiving cavity 15. When the sliding member 30 is moved to the hold position, the first receiving hole 124 and the second receiving hole 34 are offset from each other. When the sliding member is moved to the release position, the second receiving hole 34 is directly aligned with and communicates with the first receiving hole 124. Preferably, the second receiving hole 34 is a blind hole defined in a top surface of the sliding member 30.

The pin 82 is slidably installed in the first receiving hole 124. The ball 84 and the third elastic member 86 are installed in the second receiving hole 34. When the sliding member 30 is moved to the hold position, the first receiving hole 124 and the second receiving hole 34 are offset from each other. At this time, the pin 82 is fully or substantially received in the first receiving hole 124 due to gravity, with a bottom of the pin 82 abutting against the top surface of sliding member 30. The ball 84 is fully or substantially received in the second receiving hole 34, with a top abutting against a bottom surface of the base plate 12, with the third elastic member 86 being compressed. When the sliding member 30 is moved to the release position, the second receiving hole 34 is directly aligned with and communicates with the first receiving hole 124. Under the elastic force of the third elastic member 86, the top of the ball 84 is engaged in the first receiving hole 124, and then the ball 84 urges the pin out of the first receiving hole 124 to protrude into the mounting groove 11. At this time, since a bottom of the ball 84 is still received in the second receiving hole 34, the sliding member 30 is locked and cannot move. Even if the first elastic member 50 applies a resetting force to the sliding member 30, the sliding member 30 will be retained in the release position. Thus, the user can disassemble the quick assembly plate 40 from the base 10 without having to keep applying force to the unlock operating member 60. The user can even disassemble the quick assembly plate 40 with one hand, making the operation more convenient.

When installing the quick assembly plate 40, it is only necessary to engage the first inclined wall 42 of the quick assembly plate 40 in the first side of the mounting groove 11, and then press the quick assembly plate 40 downwardly so that the second inclined wall slides over the top inclined surface 27 of the locking member 20 to engage in the second side of the mounting groove 11. At the same time, a bottom surface of the quick assembly plate 40 urges the pin 82 to move downwardly to home into the first receiving hole 124, and the pin 82 urges the ball 84 to home into the second receiving hole 34. Once the ball is disengaged from the first receiving hole 124, the lock of the sliding member 30 is released. Driven by the resetting force of the first elastic member 50, the sliding member 30 is moved from the release position to the hold position, so that the first abutment 31 abuts against the second abutment 24 of the locking member 20, thereby causing the locking member 20 to rotate to the lock position and remain in place.

The above are merely preferred embodiments of the present disclosure, which are not intended to limit the present disclosure. Any modifications, equivalent substitutions and improvements made within the spirit and principles of the present disclosure shall be included in the extent of protection of the present disclosure.

The invention claimed is:

1. A quick attachable and detachable fixing apparatus for photographic equipment comprising:
    a base;
    a locking member rotatably connected to the base;
    a sliding member connected to the base and linearly slidable relative to the base;
    a quick assembly plate detachably fixed to the base by the locking member;
    a first elastic member for providing a biasing force to the sliding member, and
    a release-holding assembly, which comprises a pin, a ball and a second elastic member, the pin is slidably disposed in the base, and the ball and the second elastic member are disposed in the sliding member,
    wherein the locking member is movable relative to the base between a lock position and an unlock position, to lock the quick assembly plate to the base or unlock the quick assembly plate therefrom, and the sliding member is movable relative to the base between a hold position and a release position, wherein when the sliding member is in the hold position, the sliding member abuts against the locking member to maintain the locking member in the lock position, and the ball is received in the sliding member and compresses the second elastic member; wherein when the sliding member is moved to the release position, the locking member is released from abutment so that the locking member moves to the unlock position, the ball is partially engaged in the base and urges the pin to partially protrude out from the base; and the first elastic member is configured to provide a first force on the sliding member to bias the sliding member towards the hold position.

2. The quick attachable and detachable fixing apparatus for photographic equipment according to claim 1, wherein the sliding member has a first abutment, and the locking member has a second abutment, when the sliding member is moved to the hold position, the first abutment and the second abutment abut against each other, and at least one of the first abutment and the second abutment is a slope.

3. The quick attachable and detachable fixing apparatus for photographic equipment according to claim 1, wherein a first receiving hole for receiving the pin is defined in the base, and a second receiving hole for receiving the ball and the second elastic member is defined in the sliding member, when the sliding member is moved to the hold position, the first receiving hole and the second receiving hole are offset from each other, and when the sliding member is moved to the release position, the second receiving hole is aligned with and communicates with the first receiving hole.

4. The quick attachable and detachable fixing apparatus for photographic equipment according to claim 1 further comprising a third elastic member, the third elastic member abuts against the locking member and the base for providing a second force to bias the locking member towards the unlock position, wherein a torque applied by the second force to the locking member is less than a torque applied by the first force to the locking member.

5. The quick attachable and detachable fixing apparatus for photographic equipment according to claim 1, wherein the base comprises a base plate and a side wall provided on a top perimeter of the base plate, a mounting groove for receiving the quick assembly plate is defined in the side wall, a receiving cavity for receiving the sliding member is defined at a bottom of the base plate, and the receiving cavity communicates with the mounting groove.

6. The quick attachable and detachable fixing apparatus for photographic equipment according to claim 5, wherein the base further comprises a bottom plate fixedly connected to a bottom end of the base plate, and the bottom plate covers a lower end of the receiving cavity, thereby retaining the sliding member within the receiving cavity, two supporting portions are provided on the bottom plate, and the locking member is rotatably supported on the two supporting portions of the bottom plate through a rotating shaft.

7. The quick attachable and detachable fixing apparatus for photographic equipment according to claim 6, wherein two mating holes are recessed at the bottom of the base plate corresponding to the two supporting portions, and the two supporting portions are respectively engaged in the two mating holes, an end of each supporting portions is opposite to a bottom wall of a corresponding mating hole and together form a hole for installing the rotating shaft.

8. The quick attachable and detachable fixing apparatus for photographic equipment according to claim 5, wherein the sliding member comprises a body portion and an abutting portion located on one side of the body portion, the abutting portion is closer to a center of the base than the body portion, and the first elastic member is disposed between the abutting portion and an inner wall of the receiving cavity in a compressed state.

9. The quick attachable and detachable fixing apparatus for photographic equipment according to claim 8, wherein a height of the abutting portion exceeds a height of the body portion.

10. The quick attachable and detachable fixing apparatus for photographic equipment according to claim 1, further comprising an unlock operating member, which is connected to the sliding member and protrudes outside the base, and the unlock operating member is operably pressed to move the sliding member to the release position.

11. The quick attachable and detachable fixing apparatus for photographic equipment according to claim 2, further comprising an unlock operating member, which is connected to the sliding member and protrudes outside the base, and the unlock operating member is operably pressed to move the sliding member to the release position.

12. The quick attachable and detachable fixing apparatus for photographic equipment according to claim 3, further comprising an unlock operating member, which is connected to the sliding member and protrudes outside the base, and the unlock operating member is operably pressed to move the sliding member to the release position.

13. The quick attachable and detachable fixing apparatus for photographic equipment according to claim 4, further comprising an unlock operating member, which is connected to the sliding member and protrudes outside the base, and the unlock operating member is operably pressed to move the sliding member to the release position.

14. The quick attachable and detachable fixing apparatus for photographic equipment according to claim 5, further comprising an unlock operating member, which is connected to the sliding member and protrudes outside the base, and the unlock operating member is operably pressed to move the sliding member to the release position.

15. The quick attachable and detachable fixing apparatus for photographic equipment according to claim 6, further comprising an unlock operating member, which is connected to the sliding member and protrudes outside the base, and the unlock operating member is operably pressed to move the sliding member to the release position.

16. The quick attachable and detachable fixing apparatus for photographic equipment according to claim 7, further comprising an unlock operating member, which is connected to the sliding member and protrudes outside the base, and the unlock operating member is operably pressed to move the sliding member to the release position.

17. The quick attachable and detachable fixing apparatus for photographic equipment according to claim 8, further comprising an unlock operating member, which is connected to the sliding member and protrudes outside the base, and the unlock operating member is operably pressed to move the sliding member to the release position.

18. The quick attachable and detachable fixing apparatus for photographic equipment according to claim 9, further comprising an unlock operating member, which is connected to the sliding member and protrudes outside the base, and the unlock operating member is operably pressed to move the sliding member to the release position.

* * * * *